United States Patent [19]
Murai

[11] Patent Number: 5,671,508
[45] Date of Patent: Sep. 30, 1997

[54] CORD FASTENER

[75] Inventor: Ryukichi Murai, Toyama, Japan

[73] Assignee: YKK Corporation, Tokyo, Japan

[21] Appl. No.: 659,310

[22] Filed: Jun. 6, 1996

[30] Foreign Application Priority Data

Jun. 7, 1995 [JP] Japan ................................ 7-166950

[51] Int. Cl.$^6$ ................................................ F16G 11/00
[52] U.S. Cl. ............................................ 24/115 K; 24/129 R
[58] Field of Search ............................ 24/115 K, 115 R,
24/115 J, 115 G, 122.6, 129 R, 136 R,
712.1, 712.3, 132 R, 115 N; 160/178.2;
403/208–210, 216, 212

[56] References Cited

U.S. PATENT DOCUMENTS

| | | | |
|---|---|---|---|
| 866,144 | 9/1907 | Kobert | 24/115 R |
| 2,983,010 | 5/1961 | Huggins | 24/115 K |
| 4,049,357 | 9/1977 | Hamisch, Jr. . | |
| 4,117,998 | 10/1978 | Notoya | 24/115 R X |
| 4,236,281 | 12/1980 | Bottum | 24/115 R |
| 4,455,717 | 6/1984 | Gray | 24/115 R |
| 4,480,589 | 11/1984 | Schneider | 24/115 R X |
| 4,493,134 | 1/1985 | Karr | 24/115 R X |
| 4,771,516 | 9/1988 | Foth . | |
| 5,068,949 | 12/1991 | Horace | 24/115 R |
| 5,136,756 | 8/1992 | Krauss . | |
| 5,208,950 | 5/1993 | Merritt | 24/115 R X |
| 5,245,730 | 9/1993 | Martin | 24/129 R X |
| 5,310,274 | 5/1994 | Arakawa | 24/115 K X |
| 5,473,797 | 12/1995 | Wu | 24/115 K X |

FOREIGN PATENT DOCUMENTS

| | | |
|---|---|---|
| 2 619 989 | 3/1989 | France . |
| 51-38407 | 9/1976 | Japan . |

Primary Examiner—Peter M. Cuomo
Assistant Examiner—Robert J. Sandy
Attorney, Agent, or Firm—Hill, Steadman & Simpson

[57] ABSTRACT

A cord fastener used for fastening end portions of a cord is composed of two identical fastener members coupled together via an interlocking engagement between a locking portion and a resilient leg. The fastener members each include a cord-receiving portion for receiving the end portions of the cord, pointed teeth projecting from the cord-receiving portion to bite the material of the cord and a support wall disposed on at least one side of the cord-receiving portion at a position such that the support wall of each fastener member makes no interference with the support wall on the opposite fastener member when the two fastener members are assembled together. The cord fastener is manufactured less costly because the two identical fastener members can be molded on a single set of mold assembly.

13 Claims, 7 Drawing Sheets

CORD FASTENER

BACKGROUND OF THE INVENTION

1. Field of the Invention

The present invention relates to a cord fastener for securely holding ends of a cord which is attached to the slider pull tab of a slide fastener on a bag, or other various articles.

2. Description of the Prior Art

Japanese Utility Model Publication No. SHO 51-38407 discloses a cord fastener attached to ends of a string or cord and used as a pull tab of the cord which is utilized for achieving opening and closing operation of a slide fastener on a suitcase or another bag-like article, or other various operations.

The disclosed cord fastener has a two-piece construction composed of a male member and a female member that are resilient and molded of synthetic resin. The male member has on its backside a pair of locking projections interlockingly engageable with a pair of resilient wings, respectively, on opposite walls of the female member. For attaching a string or cord to the cord fastener, a looped end portion of the cord is held in registry with opposed round recesses or grooves in the male and female members. Then, the male and female members are pressed together to force the locking projections into interlocking engagement with the resilient wings, thereby coupling together the male and female members with the cord end portion gripped therebetween. In this coupled or assembled condition, a plurality of prongs projecting into the round grooves bite into the cord to firmly lock the cord in position against displacement relative to the cord fastener.

The conventional cord fastener disclosed in the Japanese publication specified above is composed of two members of different shapes and configurations (i.e., the male member and the female member) and hence requires two different sets of mold assemblies, one used exclusively for the production of the male member and the other for the female member. Due to the cost and time required for designing and manufacturing the mold assemblies, the conventional cord fastener is expensive to manufacture. In addition, the conventional cord fastener needs a complicated and time-consuming production control because the amounts of production of two different members which are variable with the operating conditions of respective molding systems should be controlled in parallel with each other.

SUMMARY OF THE INVENTION

With the foregoing drawbacks of the prior art in view, it is an object of the present invention to provide a cord fastener which can be manufactured less costly with a simple production control required and is capable of securing a cord firmly in position against displacement.

In one aspect the invention provides a cord fastener composed of two fastener members adapted to be coupled together to hold a portion of a cord therebetween. The fastener members have the identical construction and each includes a cord-receiving portion for receiving the portion of the cord, at least one tooth projecting from the cord-receiving portion for biting engagement with the portion of the cord, and a support wall disposed on at least one side of the cord-receiving portion at such a position that the support wall of each of the two fastener members makes no interference with the support wall on the opposite fastener member when the two fastener members are assembled together. Each of the fastener members further has a locking portion and a resilient leg interlockingly engageable with the locking portion on the opposite fastener member to join the two fastener members when the two fastener members are forced together.

In another aspect the invention provides a cord fastener composed of two fastener parts which are symmetrical in construction about an axis of rotation and integrally connected with each other by a hinge portion such that the two fastener parts are coupled together to hold a portion of a cord therebetween when they are folded together about the hinge portion. Each of the fastener parts includes a cord-receiving portion for receiving the portion of the cord, at least one tooth projecting from the cord-receiving portion for biting engagement with the portion of the cord, and a support wall disposed on at least one side of the cord-receiving portion at such a position that the support wall of each of the two fastener parts makes no interference with the support wall on the opposite fastener part when the two fastener parts are coupled together. Each of the fastener parts further has a locking portion and a resilient leg interlockingly engageable with the locking portion on the opposite fastener part to join the two fastener parts when they are folded together about the hinge portion.

The two fastener members or parts of the foregoing construction can be molded by a single set of mold assembly and hence can be manufactured less costly.

In one preferred form, the cord fastener provided in either aspect of the invention further includes a sidewall disposed on one side of the cord-receiving portion and having the locking portion. The resilient leg is disposed on the opposite side of the sidewall from the cord-receiving portion. The sidewall and the resilient leg have two confronting inside surfaces each forming the support wall.

In another preferred form, the support wall is composed of a plurality of discrete support wall members disposed on opposite sides of the cord-receiving portion and arranged in a zigzag pattern.

It is preferable that the number of the tooth is plural and the plural teeth are arranged in a zigzag pattern along an imaginary centerline of the cord-receiving portion.

The cord-receiving portion preferably has at least one recessed portion for accommodating a part of the cord portion when the latter is distorted between the two fastener members or parts coupled together. The recessed portion may be formed at each end of the cord-receiving portion.

The above and other objects, features and advantages of the present invention will become manifest to those versed in the art upon making reference to the detailed description and accompanying sheets of drawings in which a preferred structural embodiment incorporating the principles of the present invention is shown by way of illustrative example.

DETAILED DESCRIPTION

Certain preferred structural embodiments of the present invention will be described below in greater detail with reference to the accompanying sheets of drawings.

Figure 1:
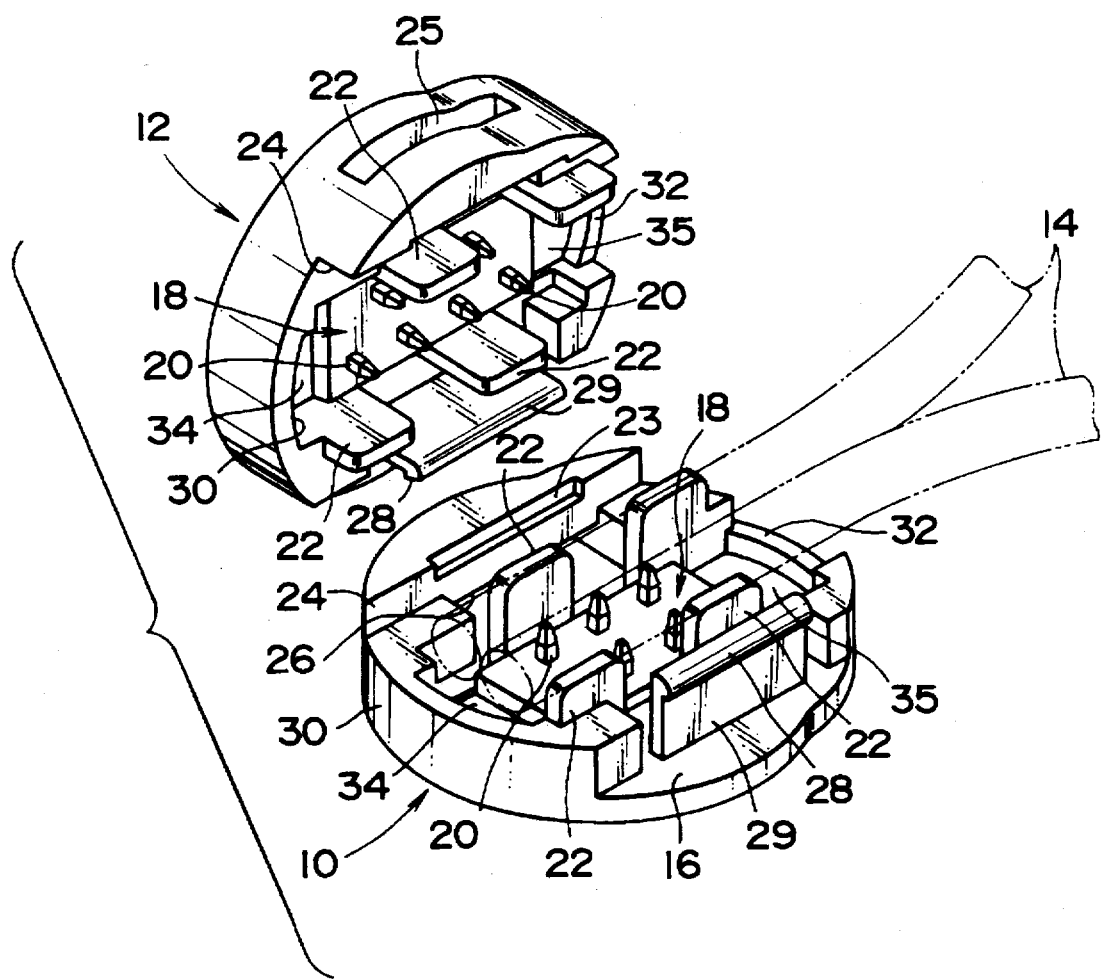
FIG 1 is an exploded perspective view of a cord fastener according to a first embodiment of the present invention.
Figure 2:
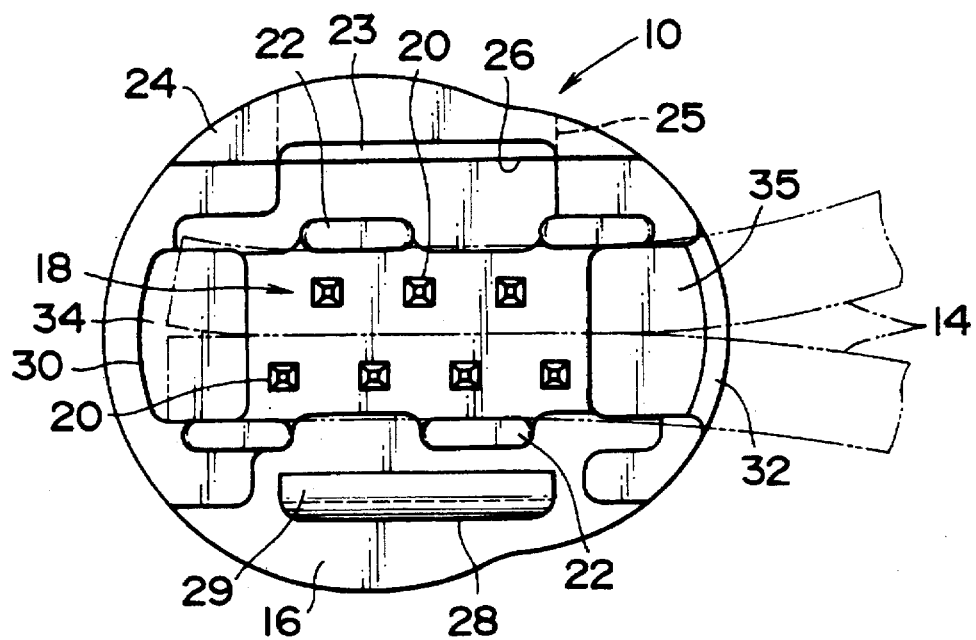
FIG. 2 is a plan view of one of two identical fastener members of the cord fastener.
Figure 3:
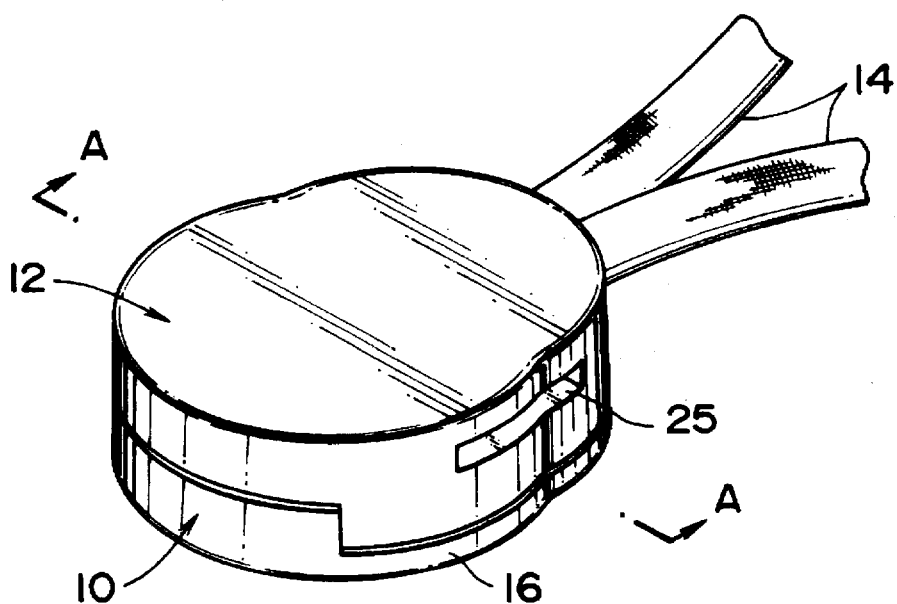
FIG. 3 is a perspective view of the cord fastener.

FIGS. 1 through 6 show a cord fastener according to a first embodiment of the present invention. The cord fastener, as shown in FIGS. 1 and 3, is composed of a first fastener member 10 and a second fastener member 12 that are closed or coupled together to hold ends of a string or cord 14 therebetween, as indicated by phantom lines shown in FIG. 1. The first fastener member 10 and the second fastener member 12 have the identical construction and are molded of synthetic resin.

The fastener members 10, 12 each include a planar base or seat plate 16, and a cord-receiving portion 18 formed on an inside surface of the seat plate 16 for receiving the ends of the cord 14. The cord-receiving portion 18 has an imaginary longitudinal centerline which is identical to a longitudinal centerline of the cord fastener composed of the fastener members 10, 12 and which is aligned with the direction of insertion of the cord 14 relative to the cord fastener. A plurality of pointed teeth 20 project from an inside surface of the cord-receiving portion 18 and they are arranged asymmetrically with each other about the imaginary longitudinal centerline of the fastener members 10, 12. In the illustrated embodiment, the teeth 20 are composed of a pair of laterally spaced rows of pointed teeth 20 longitudinally spaced at regular intervals and arranged in a staggered or zigzag pattern about the longitudinal centerline of each fastener member 10, 12, as best shown in FIG. 2. One pointed-tooth row (on the upper side in FIG. 2) includes three pointed teeth 20, while the other (on the lower side in FIG. 2) includes four pointed teeth 20. When the first and second fastener members 10 and 12 are coupled together, the pointed teeth 20 bite into the material of the cord 14 and firmly secure the cord 14 in position against displacement within the cord-receiving portions 18.

Disposed on opposite sides of the cord-receiving portion 18 are two rows of discrete support walls members 22 standing from the inside surface of the seat plate 16 and extending along the direction of insertion of the cord 14 for laterally supporting the ends of the cord 14 to undertake positioning of the cord ends within the cord-receiving portion 18. The support wall members 22 in each row are regularly spaced in the direction of insertion of the cord 14, and the support wall members 22 on the opposite sides are arranged in a staggered or zigzag pattern, as shown in FIG. 2. The support wall members 22 jointly form a support wall.

Each of the fastener members 10, 12 further has a sidewall 24 standing from the inside surface of the seat plate 16 and disposed on the outside of one row of support wall members 22 as viewed from the cord-receiving portion 18, and a locking portion 26 formed at an inner edge of an elongated aperture or opening 25 extending transversely through the sidewall 24. The opening 25 is formed by a movable core of a mold assembly (neither shown) used for forming the fastener members 10, 12, the core being movable in the transverse direction of the sidewall 24 to form the locking portion 26. A resilient leg 29 is disposed on the opposite side of the sidewall 24 from the cord-receiving portion 18 and projects from the inside surface of the seat plate 16. The resilient leg 29 has on its free end a locking projection 28 interlockingly engageable with the locking portion 26 of the opposite fastener member when the two fastener members 10 and 12 are pressed together. To this end, the locking portion 26 and the resilient leg 29 are disposed symmetrically with each other about the imaginary centerline of the fastener members 10, 12 (which is aligned with the direction of insertion of the cord 14), as shown in FIG. 2. The sidewall 24 has a recessed guide portion 23 for temporarily receiving the locking projection 28 of the resilient leg 29 to guide the resilient leg 29 at the initial stage of an operation achieved to couple the two fastener members 10, 12.

The cord-receiving portion 18 has a rear end closed by a read end wall 30 of the fastener member 10, 12, and a front end contiguous to an open end or mouth 32 of the fastener member 10, 12. The rear end wall 30 extends contiguously from an end (rear end) of sidewall 24 for positioning an endmost part of the cord 14. The mouth 32 is disposed opposite the rear end wall 30 for receiving the cords 14 when the cord 14 is inserted into the cord-receiving portion 18. The cord-receiving portion 18 has a first recessed portion 34 and a second recessed portion 35 which are adjacent to the rear end wall 30 and the mouth 32, respectively for a purpose described later on.

Figure 4:
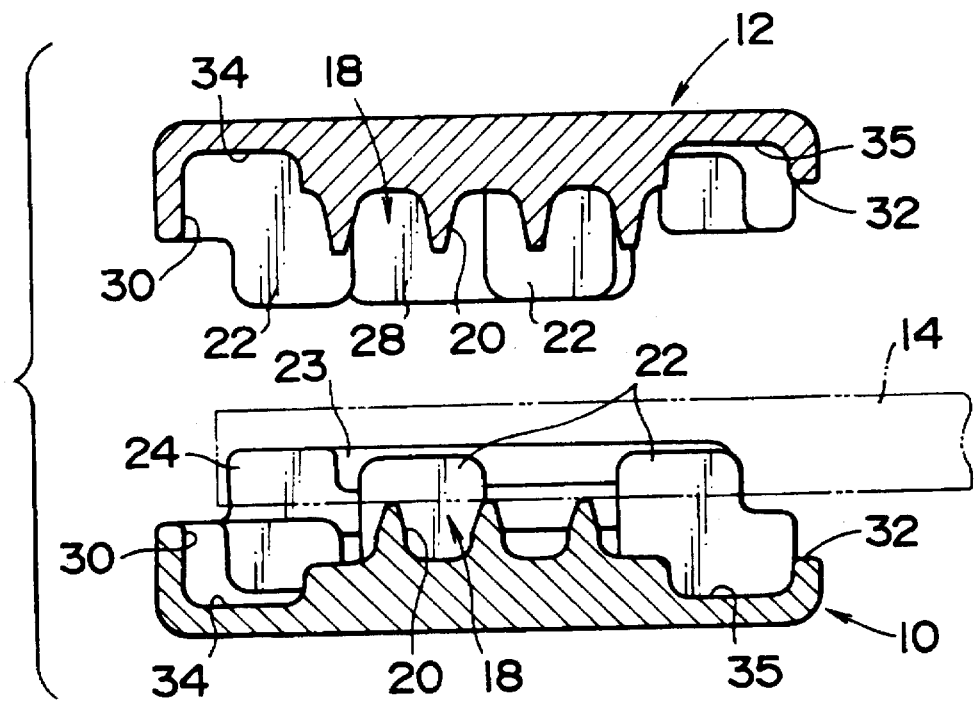
FIG. 4 is a longitudinal cross-sectional view of the cord fastener with the two identical fastener members separated from each other.
Figure 5:
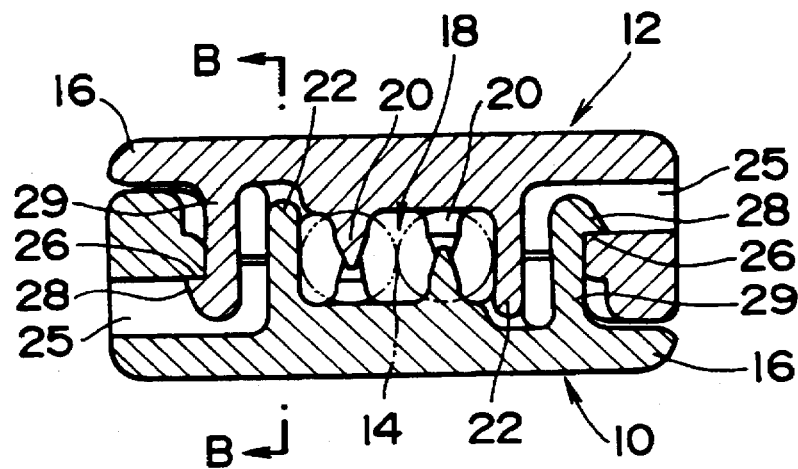
FIG. 5 is a cross-sectional view taken along line A—A of FIG. 3.
Figure 6:
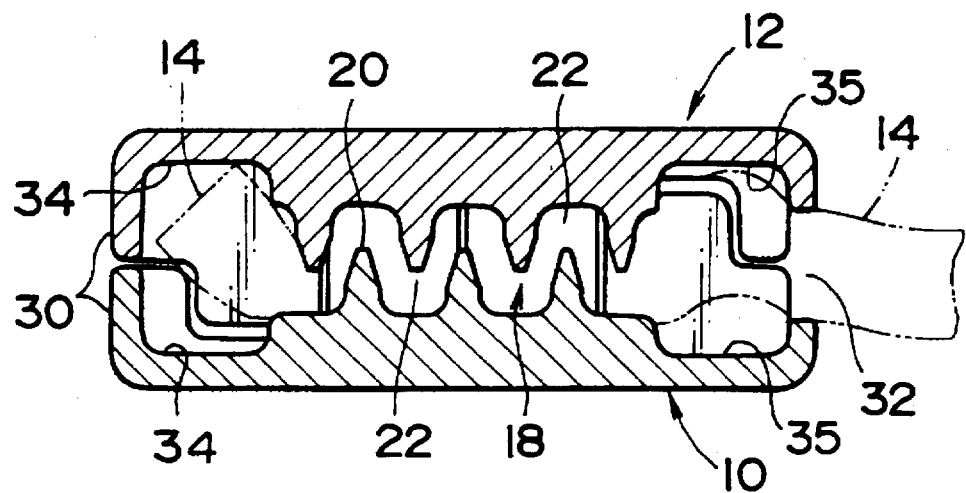
FIG. 6 is a cross-sectional view taken along line B—B of FIG. 5.

The cord fastener of the foregoing construction is used in the manner described below. At first, as shown in FIG. 4, end portions of a cord 14 are inserted from the mouth 32 into the cord-receiving portion 18 of one or the first fastener member 10 and then set in the same cord-receiving portion 18, with the cord 14 laterally supported by and between the opposite rows of support walls 22 of the first fastener member 10. Thereafter, the other or the second fastener member 12 is held in confrontation to the first fastener member 10, as shown in FIG. 4, and subsequently the first fastener member 10 and the second fastener member 12 are pressed together to grip the end portions of the cord 14 therebetween, as shown in FIGS. 5 and 6. In this instance, the pointed teeth 20 on the first and second fastener members 10, 12 bite into the material of the cord end portions and hence firmly secure them in position against displacement within a socket portion (formed jointly by the cord-receiving portions 18, 18) defined between the first and second fastener members 10, 12. Owing to the biting action of the pointed teeth 20, these parts of the cord 14 which are adjacent to endmost teeth 20 are bent or distorted in either direction (upwardly in FIG. 6). However, the upwardly distorted parts of the cord 14 are received or accommodated in the recessed portions 34, 35 of the fastener member 12, as shown in FIG. 6, so that the end portions of the cord 14 can be held easily and reliably between the first and second fastener members 10, 12 of the cord fastener.

When the first and second fastener members 10 and 12 are pressed together, the locking projection 28 on the resilient leg 29 of each fastener member 10, 12 and the locking portion 26 on the opposite fastener member 12, 10 are brought into interlocking engagement with each other to thereby connect or joint the first and second fastener members 10, 12. During that time, the resilient leg 29 on one fastener member 10, 12 is first guided on the recessed guide portion 23 of the sidewall 24 on the opposite fastener member 12, 10. In this instance, the locking projection 28 is temporarily received in the recessed guide portion 23 to insure that the end portions of the cord 14 are stably held between the support walls 22 of the two fastener members 10, 12 prior to the start of frictional engagement between the resilient leg 29 and the sidewall 24. As the two fastener members 10, 12 are further compressed together, the resilient leg 29 is resiliently flexed laterally inwardly by the sidewall 24 and then gradually slides down along an inside surface of the sidewall 24 toward the opening 25. When the locking projection 28 on the resilient leg 29 arrives at the position of the opening 25, the resilient leg 29 is allowed to spring back laterally outwardly to restore its original shape, urging the locking projection 28 into snap-fit with the locking portion 26 formed at the inner edge of the opening 25. Thus, the first and second fastener members 10, 12 are firmly coupled together and jointly form a cord fastener.

The end portions of the cord 14 held by and between the first and second fastener members 10, 12 of the cord fastener are fully concealed from the view. The cord fastener is substantially flat in profile and outlined by entirely smooth surfaces except the opening 25. Such a cord fastener is simple in appearance, rigid in construction and good in manipulability.

FIGS. 7 to 10 show second to fifth embodiments of the present invention, respectively, in which these parts which are identical to those described and shown in the first embodiment are denoted by identical reference characters and further description of the identical parts can, therefore, be omitted.

Figure 7:
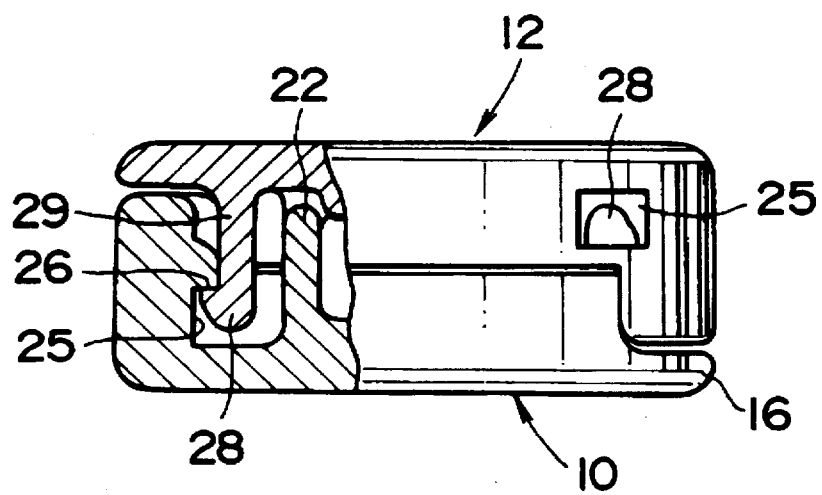
FIG. 7 is a rear view, with parts broken away for clarity, of a cord fastener according to a second embodiment of the present invention.

A cord fastener shown in FIG. 7 is different from the cord fastener of the first embodiment in that a rectangular aperture or opening 25 is formed in a joint portion between the rear end wall 30 and the sidewall 24. The opening 25 is formed by a movable core (not shown) which is movable in the longitudinal direction of the sidewall 24 which is parallel to the direction of insertion of the cord 14. The opening 25 thus formed is smaller than the opening of the first embodiment and hence able to improve the easthetic appearance of the cord fastener.

Figure 8:
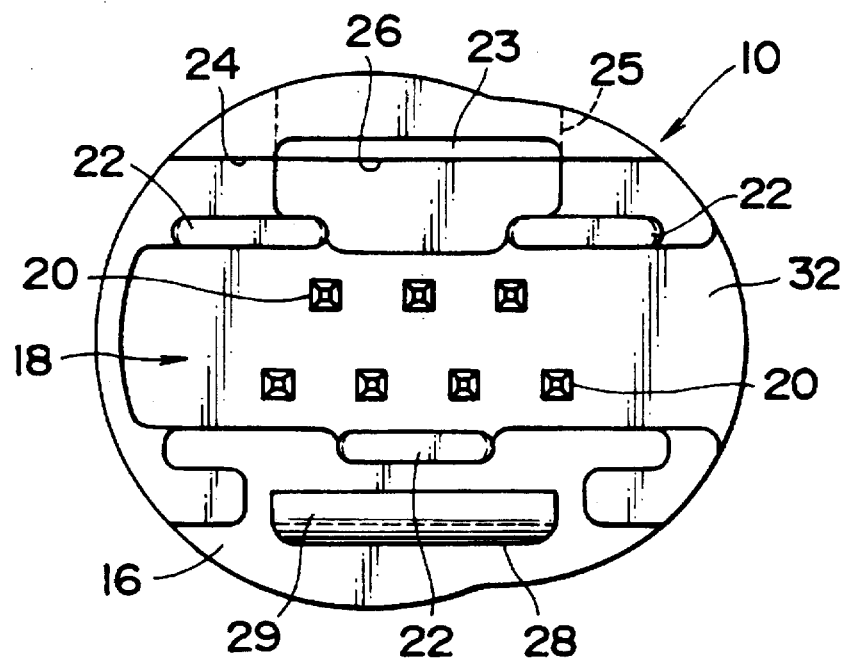
FIG. 8 is a plan view of one of two identical fastener members of a cord fastener according to a third embodiment of the present invention.

FIG. 8 shows one of two identical fastener members 10, (12) of a cord fastener according to the third embodiment of the present invention. The illustrated fastener member 10 has support wall members 22 which are smaller in number than those of the fastener member of the first embodiment and hence are able to provide a certain degree of structural simplification of the fastener member 10. More particularly, the fastener member 10 includes three support wall members 22 two of which are disposed on one side of the cord-supporting portion 18 and longitudinally spaced by a distance slightly smaller than the length of the individual support wall members 22, the remaining support wall member 22 being disposed on the opposite side of the cord-receiving portion 18 and located longitudinally between the first-mentioned two support wall members 22. In addition, the fastener member 10 is devoid of recessed portions 34, 35 (see FIG. 2) formed at opposite ends of the cord-receiving portion 18. The fastener member 10 of this embodiment is simpler in construction than the fastener member of the first embodiment and hence requires a simpler mold assembly than one used for molding the fastener member of the first embodiment. Thus, the costs for designing and manufacturing the mold assembly and the overall production cost of the cord fastener can be reduced considerably. Needless to say, the cord fastener according to the third embodiment operates in the same manner as the cord fastener of the first embodiment and is able to attain the same effects as those obtained by the cord fastener of the first embodiment.

Figure 9:
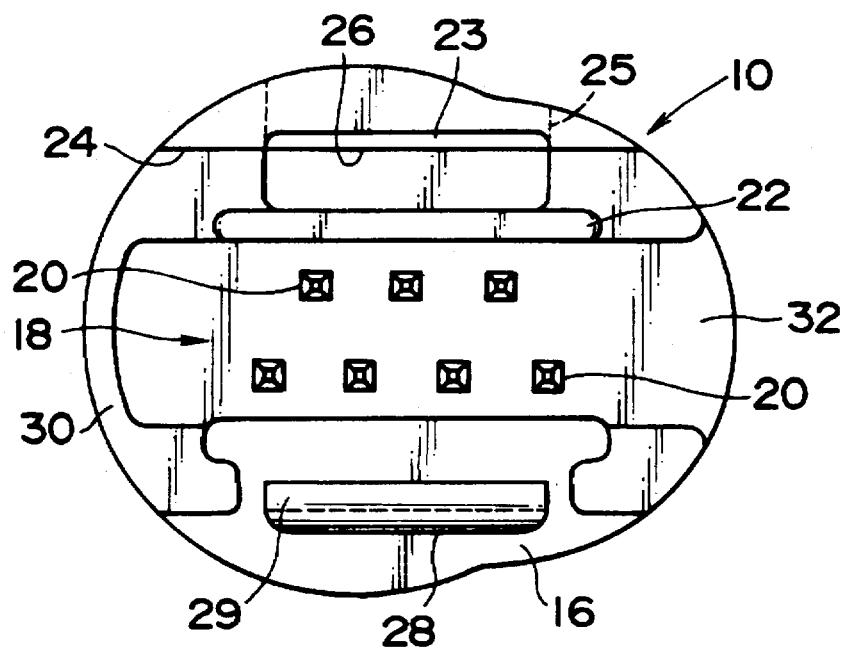
FIG. 9 is a plan view of one of two identical fastener members of a cord fastener according to a fourth embodiment of the present invention.

A modified fastener member 10 (12) according to the fourth embodiment shown in FIG. 9 is different from the fastener member of the third embodiment in that only one support wall 22 is disposed on one side of the cord-receiving portion 18 and extends alongside a major longitudinal part of the cord-receiving portion 18. When the fastener member 10 is coupled with the opposite fastener member (12), the support wall 22 on the fastener member 10 and the support wall 22 on the opposite fastener member (12) jointly hold therebetween end portions of the cord 14. The fastener member 10, (12) of the foregoing construction provides an additional reduction in production cost of an assembled cord fastener.

Figure 10:
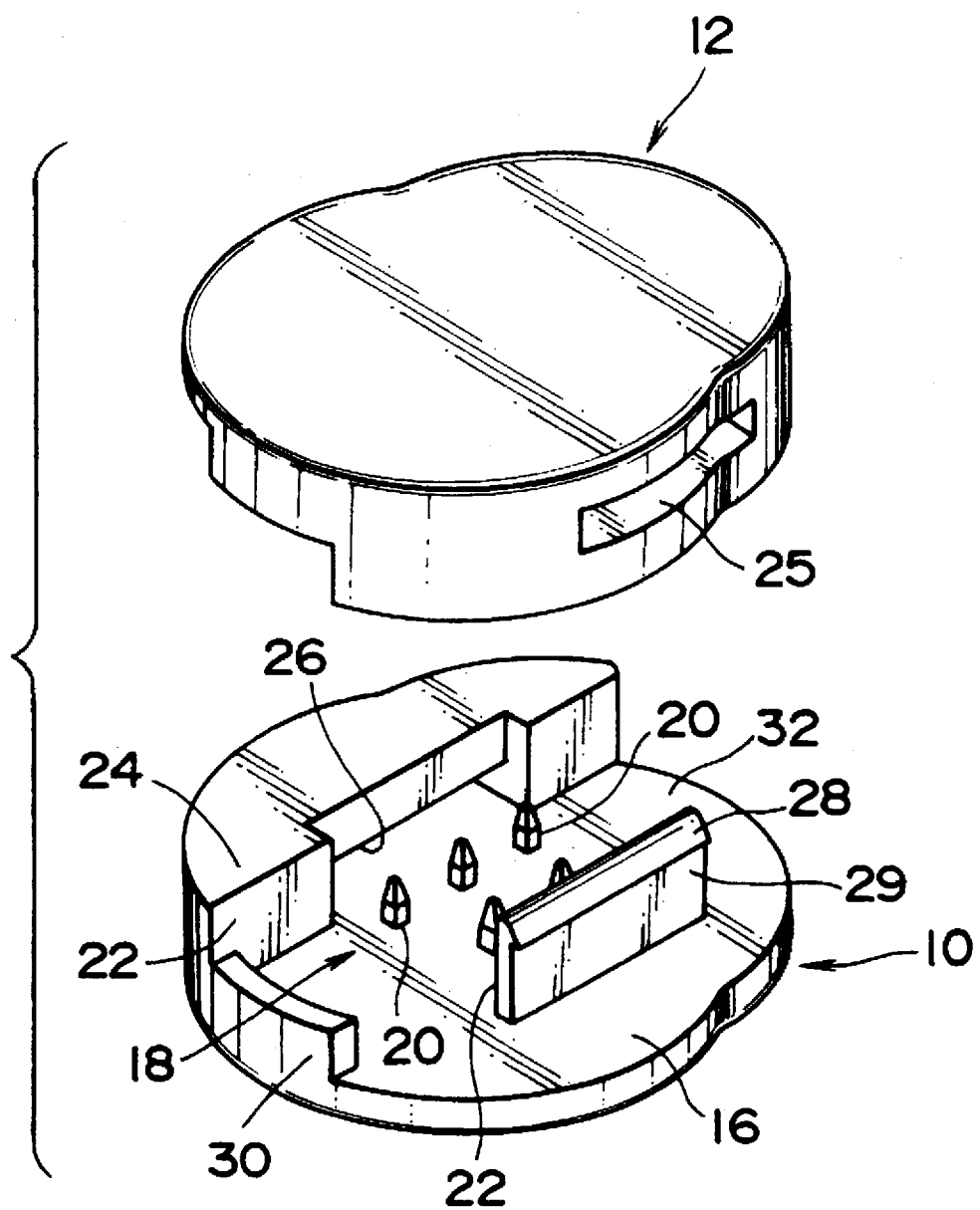
FIG. 10 is an exploded perspective view of a cord fastener according to a fifth embodiment of the present invention.

FIG. 10 shows a modified cord fastener according to the fifth embodiment of the present invention. The modified cord fastener differs from any one of the preceding embodiments in that the sidewall 24 and the resilient leg 29 have two confronting inside surfaces which are equivalent in operation as the support wall members 22 disposed on opposite sides of the cord-receiving portion 18. The cord fastener of this embodiment is simpler in construction than any one of the cord fasteners of the foregoing embodiments and hence can offer a further reduction in production cost.

Figure 11:
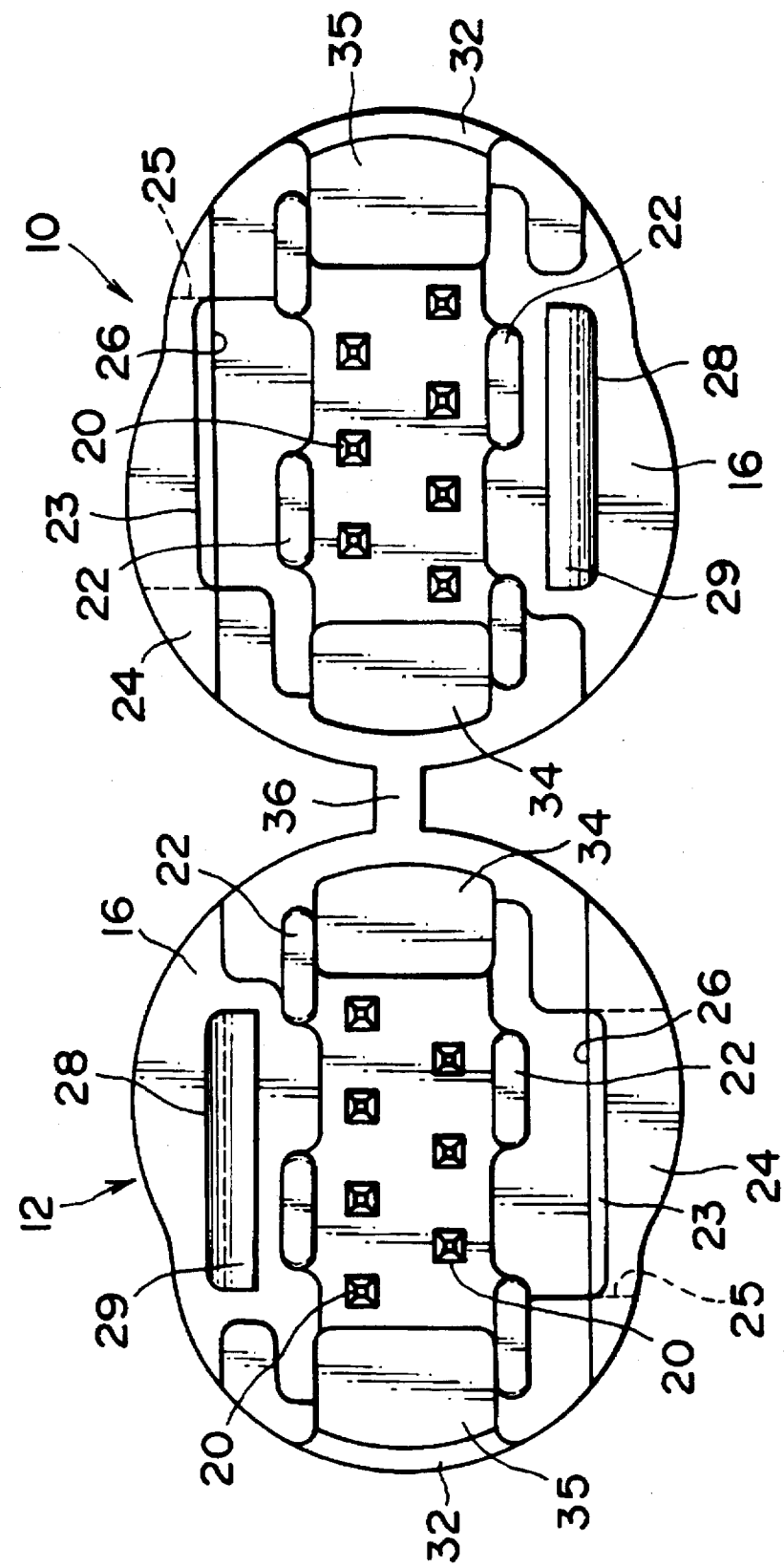
FIG. 11 is a plan view of a cord fastener according to a sixth embodiment of the present invention, with two fastener parts or members of rotation symmetry shown in the separated or uncoupled condition.

FIG. 11 illustrates a cord fastener according to a sixth embodiment of the present invention. The illustrated cord fastener is structurally and functionally the same as the cord fastener of the first embodiment of FIG. 1 with the exception that two fastener members or parts 10 are symmetrical in construction with each other about an axis of rotation and they are integrally connected with each other by a hinge portion 36 such that the fastener parts 10, 12 can be coupled together to hold a portion of a cord (not shown) when they are folded together about the hinge portion 36. In the illustrated embodiment, the fastener parts 10, 12 have the same construction and are connected at a rear end by the hinge portion 36. The fastener parts 10, 12 and the hinge portion 36 are integrally molded of synthetic resin. The hinge portion 36 is considerably thinner than the fastener parts 10, 12 and has an adequate degree of resiliency to withstand repeated bending or folding of the fastener parts 10, 12 about the hinge portion 36. Though not shown, the fastener parts 10, 12 may be disposed side by side and connected together by a hinge portion extending between opposed side surfaces of the fastener parts 10, 12. Other structural details are the same as those in the first embodiment hence require no further description.

It appears clear from the foregoing description that the cord fasteners of the present invention are each composed of two identical fastener members and hence can be manufactured by a single set of mold assembly. The molding process achievable with the use of only one set of mold assembly can pose a considerable reduction in manufacturing cost, require only a simple production control, and increase the productivity of the overall production system. Furthermore, the process for attaching the cord fastener to end portions of a cord can be achieved reliably, speedily and less costly because only one sort of components is handled. In addition to the foregoing advantages, a considerable reduction in space and cost for the storage of the fastener elements as well as a noticeable simplification of the components control system can be attained.

In attaching the cord fastener to the cord, an endmost part of the cord is bent or distorted abruptly by a biting or piercing action of the pointed teeth when the two fastener elements are pressed together. In this instance, the distorted end part of the cord is received or accommodated in the recessed portion formed at an end of the cord-receiving portion. Accordingly, the fastener members can be smoothly assembled together without requiring undue muscular effort and firmly retained in an assembled condition against accidental separation.

Obviously, various minor changes and modifications of the present invention are possible in the light of the above teaching. For example, the shape and configuration, number, and position of the cord-receiving portion should by no means be limited to those shown in the illustrated embodiment but may be changed to meet various requirements on the cord(s) used. Similarly, the shape and configuration of the locking portion and the resilient leg may be changed in various manners provided that the locking portion and the resilient leg are interlocked with each other when the two fastener members are pressed together. It is therefore to be understood that within the scope of the appended claims the invention may be practiced otherwise than as specifically described.

What is claimed is:

1. A cord fastener comprising:
two fastener members adapted to be coupled together to hold a potion of a cord therebetween, said two fastener members having identical construction and each including a cord-receiving portion for receiving the portion of the cord, at least one tooth projecting from said cord-receiving portion for biting engagement with the portion of the cord, a support wall disposed on at least one side of said cord-receiving portion at such a position that said support wall of each of said two fastener members makes no interference with the support wall on the opposite fastener member when said two fastener members are assembled together, a locking portion, and a resilient leg interlockingly engageable with said locking portion on the opposite fastener member to join said two fastener members when they are forced together in a connecting direction, said at least one tooth biting into said portion of the cord in said connecting direction during joining of said two fastener members.

2. A cord fastener comprising:
two fastener members adapted to be coupled together to hold a portion of a cord therebetween, said two fastener members having identical construction and each including a cord-receiving portion for receiving the portion of the cord, at least one tooth projecting from said cord-receiving portion for biting engagement with the portion of the cord, a support wall disposed on at least one side of said cord-receiving portion at such a position that said support wall of each of said two fastener members makes no interference with the support wall on the opposite fastener member when said two fastener members are assembled together, a locking portion, and a resilient leg interlockingly engageable with said locking portion on the opposite fastener member to join said two fastener members when they are forced together;
further including a sidewall disposed on one side of said cord-receiving portion and having said locking portion, wherein said resilient leg is disposed on the opposite side of said sidewall from said cord-receiving portion, said sidewall and said resilient leg having two confronting inside surfaces each forming said support wall.

3. A cord fastener comprising:
two fastener members adapted to be coupled together to hold a portion of a cord therebetween, said two fastener members having identical construction and each including a cord-receiving portion for receiving the portion of the cord, at least one tooth projecting from said cord-receiving portion for biting engagement with the portion of the cord, a support wall disposed on at least one side of said cord-receiving portion at such a position that said support wall of each of said two fastener members makes no interference with the support wall on the opposite fastener member when said two fastener members are assembled together, a locking portion, and a resilient leg interlockingly engageable with said locking portion on the opposite fastener member to join said two fastener members when they are forced together;
wherein said support wall is composed of a plurality of discrete support wall members disposed on opposite sides of said cord-receiving portion and arranged in a zigzag pattern.

4. A cord fastener comprising:
two fastener members adapted to be coupled together to hold a portion of a cord therebetween, said two fastener members having identical construction and each including a cord-receiving portion for receiving the portion of the cord, at least one tooth projecting from said cord-receiving portion for biting engagement with the portion of the cord, a support wall disposed on at least one side of said cord-receiving portion at such a position that said support wall of each of said two fastener members makes no interference with the support wall on the opposite fastener member when said two fastener members are assembled together, a locking portion, and a resilient leg interlockingly engageable with said locking portion on the opposite fastener member to join said two fastener members when they are forced together;
wherein the number of said tooth is plural, said plural teeth being arranged in a zigzag pattern along an imaginary centerline of said cord-receiving portion.

5. A cord fastener according to claim 1, wherein said cord-receiving portion has at least one recessed portion for receiving a part of the cord portion when the latter is distorted between two said fastener members coupled together.

6. A cord fastener comprising:
two fastener members adapted to be coupled together to hold a portion of a cord therebetween, said two fastener members having identical construction and each including a cord-receiving portion for receiving the portion of the cord, at least one tooth projecting from said cord-receiving portion for biting engagement with the portion of the cord, a support wall disposed on at least one side of said cord-receiving portion at such a position that said support wall of each of said two fastener members makes no interference with the support wall on the opposite fastener member when said two fastener members are assembled together, a locking portion, and a resilient leg interlockingly engageable with said locking portion on the opposite fastener member to join said two fastener members when they are forced together;
wherein said cord-receiving portion has at least one recessed portion for accommodating a part of the cord portion when the latter is distorted between said two fastener members coupled together;

wherein said cord-receiving portion has a first end and a second end remote from said first end, said recessed portion being located at each of said first and second ends of said cord-receiving portion.

7. A cord fastener comprising:

two fastener parts symmetrical in construction about an axis of rotation and integrally connected with each other by a hinge portion such that said two fastener parts are coupled together to hold a portion of a cord therebetween when they are folded together about said hinge portion, each said fastener parts including a cord-receiving portion for receiving the portion of the cord, at least one tooth projecting from said cord-receiving portion for biting engagement with the portion of the cord, a support wall disposed on at least one side of said cord-receiving portion at such a position that said support wall of each of said two fastener parts makes no interference with the support wall on the opposite fastener part when said two fastener parts are coupled together, a locking portion, and a resilient leg interlockingly engageable with said locking portion on the opposite fastener part to join said two fastener parts when they are folded together about said hinge portion, said fastener parts joined in a joining direction, said at least one tooth biting said cord portion in said joining direction during joining of said fastener parts.

8. A cord fastener according to claim 7, wherein said two fastener parts and said hinge portion are integrally molded of synthetic resin.

9. A cord fastener comprising:

two fastener parts symmetrical in construction about an axis of rotation and integrally connected with each other by a hinge portion such that said two fastener parts are coupled together to hold a portion of a cord therebetween when they are folded together about said hinge portion, each said fastener parts including a cord-receiving portion for receiving the portion of the cord, at least one tooth projecting from said cord-receiving portion for biting engagement with the portion of the cord, a support wall disposed on at least one side of said cord-receiving portion at such a position that said support wall of each of said two fastener parts makes no interference with the support wall on the opposite fastener part when said two fastener parts are coupled together, a locking portion, and a resilient leg interlockingly engageable with said locking portion on the opposite fastener part to join said two fastener parts when they are folded together about said hinge portion; further including a sidewall disposed on one side of said cord-receiving portion and having said locking portion, wherein said resilient leg is disposed on the opposite side of said sidewall from said cord-receiving portion, said sidewall and said resilient leg having two confronting inside surfaces each forming said support wall.

10. A cord fastener comprising:

two fastener parts symmetrical in construction about an axis of rotation and integrally connected with each other by a hinge portion such that said two fastener parts are coupled together to hold a portion of a cord therebetween when they are folded together about said hinge portion, each said fastener parts including a cord-receiving portion for receiving the portion of the cord, at least one tooth projecting from said cord-receiving portion for biting engagement with the portion of the cord, a support wall disposed on at least one side of said cord-receiving portion at such a position that said support wall of each of said two fastener parts makes no interference with the support wall on the opposite fastener part when said two fastener parts are coupled together, a locking portion, and a resilient leg interlockingly engageable with said locking portion on the opposite fastener part to join said two fastener parts when they are folded together about said hinge portion;

wherein said support wall is composed of a plurality of discrete support wall members disposed on opposite sides of said cord-receiving portion and arranged in a zigzag pattern.

11. A cord fastener comprising:

two fastener parts symmetrical in construction about an axis of rotation and integrally connected with each other by a hinge portion such that said two fastener parts are coupled together to hold a portion of a cord therebetween when they are folded together about said hinge portion, each said fastener parts including a cord-receiving portion for receiving the portion of the cord, at least one tooth projecting from said cord-receiving portion for biting engagement with the portion of the cord, a support wall disposed on at least one side of said cord-receiving portion at such a position that said support wall of each of said two fastener parts makes no interference with the support wall on the opposite fastener part when said two fastener parts are coupled together, a locking portion, and a resilient leg interlockingly engageable with said locking portion on the opposite fastener part to join said two fastener parts when they are folded together about said hinge portion;

wherein the number of said at least one tooth is plural, said plural teeth being arranged in a zigzag pattern along an imaginary centerline of said cord-receiving portion.

12. A cord fastener according to claim 7, wherein said cord-receiving portion has at least one recessed portion for receiving part of the cord portion when the latter is distorted between two said fastener parts coupled together.

13. A cord fastener comprising:

two fastener parts symmetrical in construction about an axis of rotation and integrally connected with each other by a hinge portion such that said two fastener parts are coupled together to hold a portion of a cord therebetween when they are folded together about said hinge portion, each said fastener parts including a cord-receiving portion for receiving the portion of the cord, at least one tooth projecting from said cord-receiving portion for biting engagement with the portion of the cord, a support wall disposed on at least one side of said cord-receiving portion at such a position that said support wall of each of said two fastener parts makes no interference with the support wall on the opposite fastener part when said two fastener parts are coupled together, a locking portion, and a resilient leg interlockingly engageable with said locking portion on the opposite fastener part to join said two fastener parts when they are folded together about said hinge portion;

wherein said cord-receiving portion has at least one recessed portion for accommodating a part of the cord portion when the latter is distorted between said two fastener parts coupled together;

wherein said cord-receiving portion has a first end and a second end remote from said first end, said recessed portion being located at each of said first and second ends of said cord-receiving portion.

* * * * *